United States Patent Office 3,019,413
Patented Jan. 30, 1962

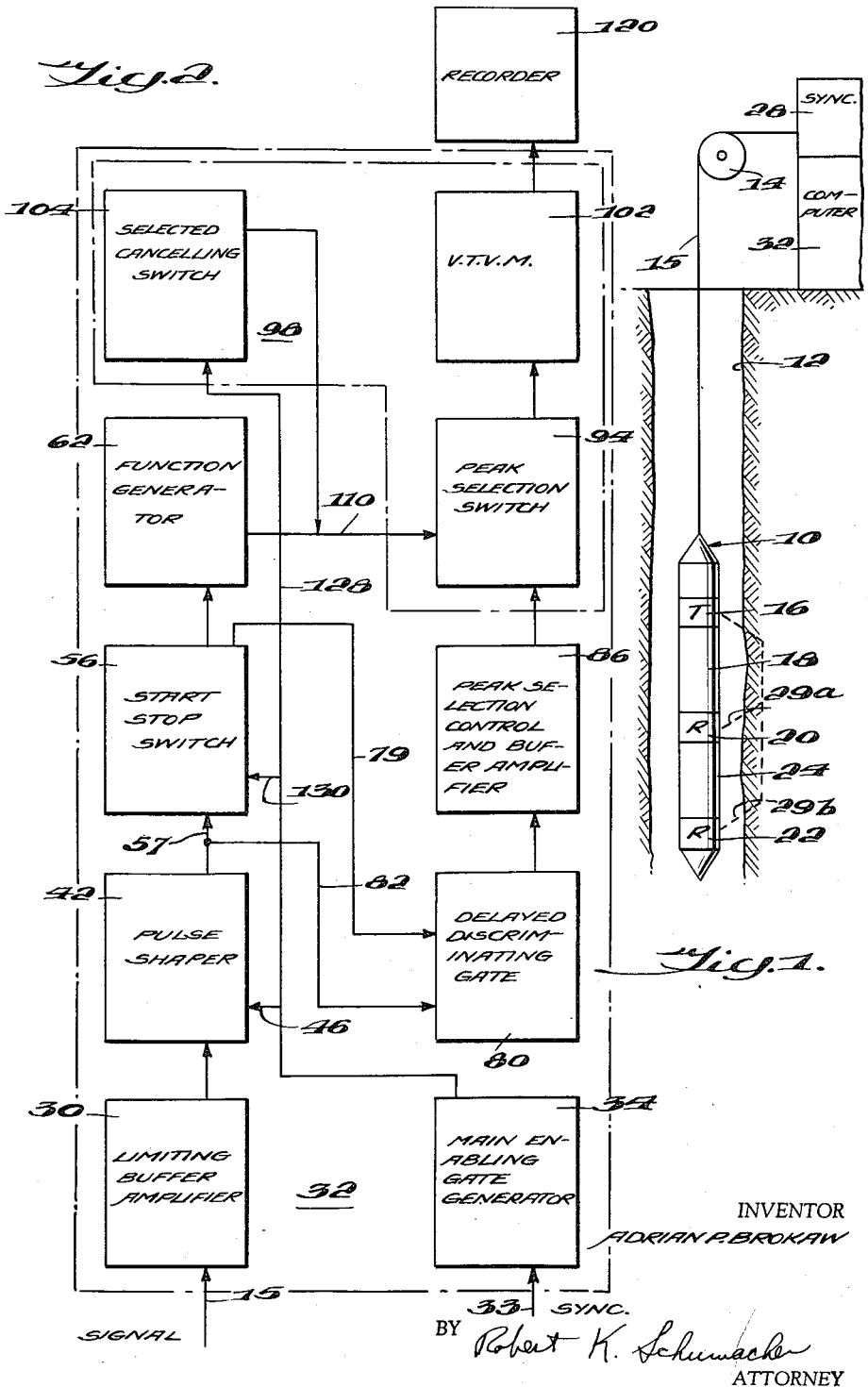

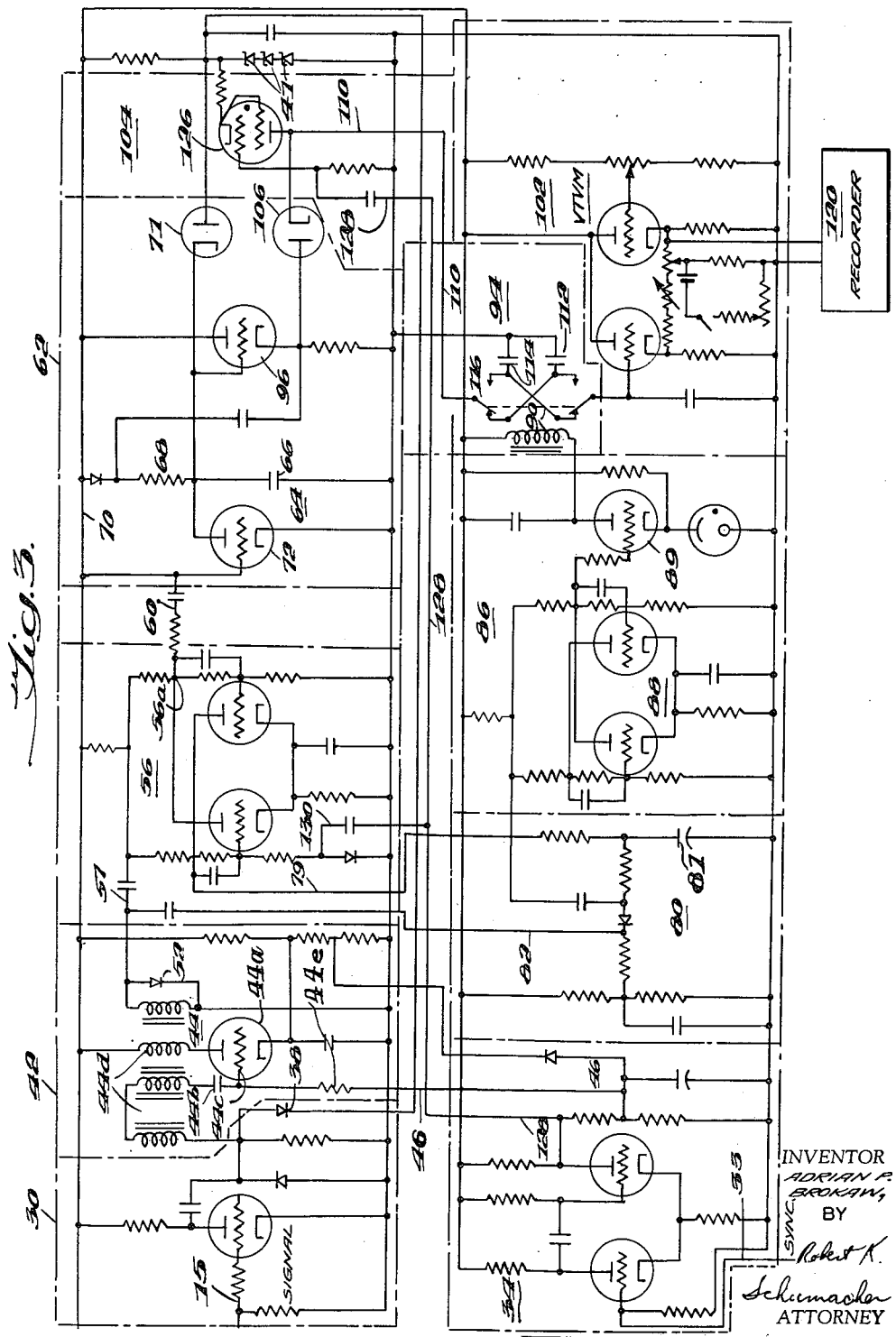

3,019,413
DISCRIMINATING INTERVAL TIME COMPUTER
FOR ACOUSTIC WELL LOGGING SYSTEMS
Adrian Paul Brokaw, Tulsa, Okla., assignor, by mesne
assignments, to Dresser Industries, Inc., Dallas, Tex., a
corporation of Delaware
Filed Apr. 15, 1959, Ser. No. 806,586
15 Claims. (Cl. 340—15)

The present invention relates to interval time computers for acoustic well logging systems, and has more particular reference to a computer, or like device, which can, with discrimination, accept certain input information and supply useful output information derived from the input information by means of a logical process, or reject other or random input information and supply the useful output information previously stored in the computer.

The analysis of subsurface formations by measuring the time interval during which acoustic energy passes between two points in the formations adjacent an acoustic well logging tool, has the disadvantage that a substantial amount of extraneous noises are present about the tool which introduces errors into the analysis. Some measurements would then represent the time interval between noise and a signal, or simply the time interval between noises.

The noises are due to a variety of sources, such as the noise caused by a logging tool or a cable supporting the tool, striking or impacting against the side of the bore hole surrounding the tool or cable. This impact generates extraneous and unwanted noise, and is generally known as "road noise."

Another disadvantage is that on occasions the signals returned from the formation are of such low amplitude that detection of first arrival of signal is impossible without increases in gain beyond a reasonable point. Measurements then do not present the actual interval, but an interval substantially larger.

Prior systems for acoustic well logging provide devices that pass acoustic energy through formations adjacent a well bore in which a time interval between pulses is in response to the acoustic velocity of the energy, that is, the velocity of sound through the formations. The time interval between pulses is converted at the earth's surface to an electrical impulse for recording on an instrument. It has often been the experience with these devices that the time interval between pulses has not always been accurately represented by the recording equipment.

Accordingly, it is an object of the present invention to provide an improved interval time computer for acoustic well logging systems.

Another object of the invention is to provide an interval time computer capable of rejecting invalid signal information.

A further object of the invention is to provide an acoustic well logging system in which valid information is stored and repetitively measured during intervals in which no valid information is being received.

A still further object of the invention is to provide an acoustic well logging system in which previously stored information is cancelled when subsequent valid information is received.

The device of the invention comprises a computer which measures a relatively short interval of time bounded by two electrical pulses and presents this measurement of time in a form suitable for recording on a permanent record. The measurement is to be considered as useful or valid information for evaluation only if the pulses fall within certain first and second determined time intervals, respectively, during which the computer is "on." The first "on" time interval follows an "off" time interval initiated by a trigger pulse, during which the computer is "off." During the "on" time interval, the computer may receive the first electrical pulse, provided this arrival is within a reasonable time. Receipt of the first electrical pulse initiates a second "off" time interval, during which the computer is again "off." The second "on" time interval follows the second "off" time interval. In the second "on" time interval, the computer may receive the second electrical pulse. When electrical pulses are applied to the computer during either of the "off" time intervals, the computer rejects the pulses as indicative of invalid information.

The first "off" time interval prevents the acceptance by the computer of pulses triggered by road noises on the first channel or receiver of the logging tool, and the second "off" time interval prevents the acceptance by the computer of pulses triggered by road noises on the second channel or receiver of the logging tool.

The interval between the two electrical pulses is an indication of physical characteristics of the formation of the well bore, and information obtained from this interval is recorded. When the measurement is not valid information, the information is not presented for recording, and the last valid measurement obtained in the device persists for the purpose of subsequent recording. The device according to the invention is used in an acoustic oil well logging system in conjunction with means for measuring the velocity of a sound wave passing between two points in the formation adjacent a logging tool in a borehole.

Throughout the description of the invention the term "valid signal" is used to mean the first signal picked up by a receiver which has been transmitted from a transmitter after having passed through formations surrounding a well bore. "Invalid signals" are defined as those signals having their origin as random noise due, for example, to the acoustic logging tool impacting against the walls of a bore hole, or those signals which are generated by sonic energy from the transmitting transducer that does not arrive at the respective receivers first in time.

Perhaps the outstanding advantage of the new circuit arrangement resides in a system for providing a repetition of the prior signal information for recording where there is an absence of acceptable signal information.

One of the most important applications of the new circuit is in the art of acoustic velocity well logging. It is essential that the recording of information derived from an acoustic logging tool represents a true or substantially true picture of the information obtained from the well formations. The computer of the invention provides for recording and re-recording of the last valid signal received from an acoustic logging tool. The application of the invention may be made to other systems for purposes where it is essential to reject random information and re-record the last and best available valid information.

These, as well as further advantages, which are inherent in the invention, will become apparent from the following description, reference being had to the accompanying drawings wherein:

FIGURE 1 is a diagrammatic view of an acoustic well logging tool in a well bore hole in accordance with the invention;

FIGURE 2 is a block diagram representing the essential components of a computer embodying the present invention; and FIGURE 3 is a schematic representation of a more detailed arrangement in a computer according to a preferred embodiment of the invention.

Referring now to the figures, there is illustrated an acoustic well logging tool 10 suspended in a well bore hole 12 from a pulley 14 by a cable 15. The acoustic well logging tool 10 includes a transmitting transducer 16, an insulating member 18, a first receiving transducer 20 spaced from the transmitting transducer by the insulating member 18, and a second receiving transducer 22 spaced from the first receiving transducer by an insulating member 24.

A synchronizer 28 at the earth's surface develops a trigger pulse which is fed through the cable 15 to the logging tool 10. The trigger pulse excites the transmitting transducer so that acoustic energy is emanated from the tool. The receiving transducer 20 senses acoustic energy transmitted from the transmitting transducer 16 after passing along a path 29a through a portion of the formations surrounding the bore hole 12. The sensing of acoustic energy by the receiving transducer 20 develops a receiver pulse which is coupled through the cable 15 to the earth's surface to a limiting buffer amplifier 30 (FIGS. 2 and 3) of a computer 32. The receiving transducer 22 similarly senses acoustic energy generated by the transmitting transducer 16 after passing along a path 29b. The sensing of acoustic energy by the receiving transducer 22 develops a second receiver pulse which is coupled through the cable 15 to the limiting buffer amplifier 30 of the computer. The subsurface apparatus provides but these two pulses per cycle, although one or both may be erroneous or even missing.

A computer is generally defined as a device which can accept input information and supply useful output information derived from the input information by means of a logical process. In this instance, as described below, the computer includes certain control circuits which effect carrying out of instructions in a proper sequence, the interpretation of each instruction, and the application of a command as a result of the instructions to other circuits in accordance with the interpretation. Although the preferred embodiment of the invention shows an analog measuring circuit, it is within the scope of the invention to use a digital measuring circuit.

A portion of the pulse from the synchronizer 28 for exciting the acoustic transmitting transducer 16 in the tool is coupled by a conductor 33 to a main enabling gate generator 34. The main enabling gate generator may generally be a monostable multivibrator, often known in the art as a univibrator. The enabling gate generator 34 produces an output pulse to circuits which respond as a gate. A gate is a circuit having an output and a plurality of inputs so designed that the output is energized when and only when a certain definite set of input conditions are met, performing the circuit function equivalent to the logical "and." The enabling gate generator provides one of these inputs.

The enabling gate generator 34 is arranged to produce an output pulse at the end of a preselected interval after actuation by the pulse from synchronizer 28. The computer 32 is therefore, "off" during the preselected interval. The preselected interval is sufficiently long to allow spurious and extraneous noises generated coincident with the trigger pulse to decay. When the enabling gate generator 34 produces its output pulse after the preselected interval, the output pulse produced is sufficiently long to encompass the total interval of time that pulse information is expected to be received from the tool 10 under ordinary conditions. The total interval of time is considered reasonable and adequate to receive pulses corresponding to the wide range of acoustic velocities of the bore hole formations normally encountered.

Output 46 of the enabling gate generator 34 is connected to a pulse shaper 42 to enable it for the duration of the output pulse.

A limiting buffer amplifier 30 responds to signal information or pulses having the intervals therebetween related to information, as well as extraneous noises, which is received from the tool 10 over cable 15. The limiting buffer amplifier inverts the received pulses, and rectifier 38 provides a voltage limiting feature for the inverted pulses by providing a clamping action when the voltage begins to exceed a voltage across a reference including Zener diodes 41. The function of the buffer amplifier 30, as is well known, is as an isolation circuit, used to avoid reaction of a driven circuit, i.e., the computer, upon the corresponding driving circuit, i.e., the tool.

The output of the limiting buffer amplifier is coupled to a pulse shaper 42, which in the preferred embodiment shown, is a blocking oscillator 44. The effect of the pulse shaper is to reduce the rise-time and width of the input pulse thereto, from say 20 microseconds to 1 microsecond.

The blocking oscillator 44 is a relaxation oscillator in which the anode current of a tube 44a is unblocked by an input pulse positively charging a capacitor 44b coupled to a grid 44c. The anode and grid circuits of the tube are closely coupled through transformer 44d. The grid circuit has a high-value grid leak 44e. When oscillation is initiated by the input pulse, grid current flows in the capacitor 44b and develops across it a bias many times the cut-off value of the tube. In this way the anode current of the tube is blocked quickly in less than a cycle of oscillation, and oscillation ceases. The negative charge on the grid capacitor leaks away quickly since the output pulse from the enabling gate generator tends to place the tube in conduction again. When the second or next received pulse positively charges the capacitor 44b, the cycle recommences.

A rectifier 52 in the output side of the blocking oscillator 44 shapes the pulse provided by the blocking oscillator by clipping the overshoot portion of the pulse beyond the first half-cycle.

The first received pulse passing through the pulse shaper 42 is coupled to a start-stop switch 56 to turn it "on." The second received pulse from the pulse shaper turns it "off." The start-stop switch 56 may be of any type of bistable circuit such as multivibrator, flip-flop, or Eccles-Jordan configuration, such that each successive pulse on the signal input lead 57 will reverse the operating state of the circuit.

As the first received pulse appears at the start-stop switch 56, there is a change in voltage at an output 56a of the switch. The second received pulse appearing at the start-stop switch resets the switch to its original or first state. This action is well known in bistable devices.

The output 56a of the start-stop switch 56 is coupled through network 60 to a function generator 62. The function generated by the generator 62 is one having single values along the x and y coordinates of the function, generally known as a monotonic function. The monotonic function is usually a linear function and an example of a generator for the function is a bootstrap circuit 64. The "on" condition of the switch 56 initiates a charging operation of a condenser 66 through a resistor 68 from a positive potential source 70. The "off" condition of the switch 56 stops altogether the charging operation of the condenser 66. The second received pulse, as mentioned above, places the switch in the "off" condition, and therefore, stops the charging of the condenser.

The peak output voltage of the function generator 62 is a precise function of the time the bootstrap circuit was charging the condenser, or that the function generator was "on." When the switch 56 is turned "off," a clamp tube 72 discharges the condenser 66 to a voltage coupled from the Zener diodes 41 through a diode 71. The peak output value is proportional to the time interval between the first received pulse and the second received pulse.

A second output of the start-stop switch 56 is coupled by conductor 79 to a delayed discriminating gate 80. The delayed discriminating gate is in a normally "off" condition and therefore blocks any signals from the pulse shaper 42 coupled thereto by conductor 82. The function of the delayed discriminating gate is simply to provide a gate or open passage for coupling the second output after an interval defined as a predetermined minimum time between acceptable pulses, i.e., the minimum time between the first received pulse and the second received pulse. The coupling of the second output after the minimum interval of time is from the pulse shaper 42 through delayed discriminating gate 80 to a peak selection control and buffer amplifier 86, which comprises a conventional multivibrator circuit 88 having two conditions of stability and a buffer amplifier 89. The buffer amplifier 89 couples the multivibrator circuit 88 to a relay 90 of a peak selection switch 94.

The output voltage of the bootstrap circuit 64 of the function generator 62 is coupled from cathode follower 96 through a disconnect diode 106 to a consecutive peak reading voltmeter 98, which includes the peak selection switch 94 coupled to a vacuum tube voltmeter (VTVM) 102 and a selected cancelling switch 104 coupled to the peak selection switch 94.

The disconnect diode 106 and a conductor 110 couple the cathode follower 96 to a storage or memory device such as a condenser 112, 114, depending of course, on which position a double-pole double-throw switch 116 is positioned. In the instance shown, the condenser 112 receives for storage the charge from the function generator 62.

When the multivibrator circuit 88 of the peak selection control changes its condition of stability in response to having received a second received pulse through the delayed discriminating gate 80, the peak selection switch 94 changes the position of the DP—DT switch 116 so that the peak value of the stored information on the condenser 112 is presented to the vacuum tube voltmeter 102.

The peak value presented to the voltmeter 102 is then coupled to a utilization device or a recorder 120 of conventional construction. The recorder provides a graphic presentation of the information relative to the time interval between acceptable pulses.

If any previously stored peak value was stored in condenser 114, the position of the DP—DT switch 116 is now in a position to connect the condenser having the previously stored signal to the selected cancelling switch 104. Then at the beginning of the next cycle, the stored signal peak value is destroyed or discharged by conduction of the tube 126 in the selected cancelling switch 104. The tube 126 is rendered conductive by a pulse from the main enabling gate generator conducted over line 128.

There are certain conditions under which the information contained in the pair of two electrical pulses indicates that it is not valid and causes the pair of electrical pulses providing this invalid information to be rejected.

One instance in which rejection occurs is in the case when the two electrical pulses having their intervals measured comprise an interval which is too large, i.e., the interval is longer than the longest time sound would take to arrive at the second receiver. This indicates failure to receive the second pulse and the information is invalid. In this instance, the main enabling gate generator 34 is "off," and the pulse shaper 42 is unresponsive by the time one or both of the pulse pair arrives from the acoustic logging tool and prevents pulse shaper 42 from producing an output. Since there is no reception of at least the second pulse of the pair by the start-stop switch 56 from the pulse shaper 42, the peak selection control 86 does not operate to pass a signal to the peak selection switch 94 for storing the peak value of the function generator. The peak selection control does not operate the peak selection switch 94 to present the peak value of the function generator for storage. The peak selection switch 94 holds the last valid reading that had been received, which is presented to the vacuum tube voltmeter. The faulty or invalid reading which has been stored in the peak selection switch 94 is obliterated by the selected cancelling switch 104 at the start of the next cycle of operation just prior to receiving the next pair of electrical pulses.

When the first pulse of the pair of electrical pulses to be measured appears too short a time interval after the sync pulse has been received by the main enabling gate generator 34, indicating that road noise has produced the first pulse, the delay time which occurs between the sync pulse and the opening of the main enabling gate generator 34 will be effective to delay the opening or enabling of the pulse shaper 42 so that only the second pulse of the pair of electrical pulses may be allowed to pass through the pulse shaper. This second pulse generates the first pulse to appear at the output of the pulse shaper 42. There is now no other pulse to be received by the pulse shaper for producing a second output thereof. Since no second pulse is provided from the pulse shaper there is no pulse to pass through the delayed discriminating gate 80. The peak selection control does not operate. Therefore, any invalid peak value generated is not presented to the VTVM. The peak selection switch 94 retains the last valid reading, which is coupled to the vacuum tube voltmeter and recorder 120 in a manner similar to that described above and the incorrect or invalid information does not appear at the output of the vacuum tube voltmeter for recording.

Another instance in which the information is considered to be invalid is when the pair of two electrical pulses are so close to each other as to indicate an interval of time too short for the acoustic energy to have traversed the formation adjacent the well bore and it may be inferred that road noises are being received by the acoustic well logging tool. Because of these certain instances of invalid information being received by acoustic logging apparatus, precaution is taken to provide that the output of the peak selection switch 94 remains at a value corresponding to the last valid pulse pair of electric pulses and is recorded again by the vacuum tube voltmeter and recorder when this instance does occur. This is accomplished by adjusting the capacitance of condenser 81 to provide a proper time constant to set the minimum time interval between acceptable pulses of an acceptable pulse pair into the delayed discriminating gate 80.

When the pulses of the pulse pair to be measured are found to be too close in time to each other, i.e., the interval therebetween is too short, the second pulse appears at the output of the pulse shaper 42 in the usual manner, described above, but before the delayed discriminating gate 80 has been opened by an output pulse from the start-stop switch 56. The second pulse from the pulse shaper 42 was ready to pass through the delayed discriminating gate 80 to the peak selection control 86, but, as is seen, the start-stop switch 56 did not provide a pulse in time for opening the delayed discriminating gate 80 for the passage of the second pulse from the pulse shaper to the peak selection control. Therefore, the second pulse will not trigger the peak selection control 86 and a similar result of rejecting invalid information is achieved as in the previous two instances.

In the first two instances mentioned above, there is no second pulse out of the pulse shaper 42 and the start-stop switch 56 does not receive a stop signal. It is therefore necessary to make a connection 130 from the output of the enabling gate generator 34 to the start-stop switch 56 to generate a stop signal at the end of the main enabling gate interval to insure that the start-stop switch 56 is recycled and ready for the start of the next cycle of measurement. If the start-stop switch 56 has already received a second signal from the pulse shaper 42 this additional stop signal from the main enabling gate generator 34 has no effect.

Various of the time intervals mentioned above are determined by the respective circuit components, which may be selected to provide the appropriate time constants in a manner well known in the art.

A number of different intervals fall within the scope of the invention. The invention contemplates the exclusion of signals occurring during periods when valid information is unlikely or even impossible. Thus, it is convenient to adjust the first "off" period to an interval of time following transmission of acoustic energy to the time necessary for acoustic energy to travel from the acoustic transmitter to the nearest of the acoustic receivers at the greatest acoustic velocity normally encountered in the earth formations being measured. The first "on" interval may conveniently last from that time to at least the time necessary for acoustic energy to reach the nearest receiver at the lowest acoustic velocity normally encountered. Reception of the first pulse begins the second "off" interval, which may conveniently last for the time required for acoustic energy to pass through the earth formations between points opposite each of the receivers at the greatest acoustic velocity normally encountered, whereupon the second "on" interval begins, which may last until the time required for acoustic energy to pass from the transmitter to the farthest of the receivers at the lowest acoustic velocity normally encountered. These intervals may be predetermined from empirical data. Alternatively, the "on" and "off" time intervals may be related to the measurements being made. For example, abrupt changes in measurement are unlikely; in general the measurement in one cycle will be very near the measurement of the preceding and succeeding cycles. Therefore, the intervals may be appropriately adjusted to discard, as invalid, pulses in one cycle that do not occur relatively near the respective times of the pulses of the preceding cycle.

It should be understood that the specific apparatus herein illustrated and described is intended to be representative only, as many changes may be made therein without departing from the clear teachings of the invention. Accordingly, reference should be made to the following claims in determining the full scope of the invention.

I claim:

1. A computer in an acoustic well logging system for discriminating between valid signal information represented as time intervals between a pair of accepted pulses and invalid signal information represented as time intervals between a pair of rejected pulses, comprising means to accept a pair of pulses as valid signal pulses when the pulses occur within a predetermined time range following a synchronizing pulse, means generating a function pulse in response to said pair of pulses, means for storing the valid signal information in response to the function pulse, and utilization means for measuring the stored valid signal information.

2. An electronic computer comprising means to reject pulses representing invalid signal information when pulses occur without a predetermined time range following a synchronizing pulse, means to accept pulses as valid signal information when the pulses occur within a predetermined time range following the synchronizing pulse and including means for storage of the last received valid signal information, means to select for recording the last received valid signal information in the storage means when invalid signal information is rejected, and means for selecting valid signal information for storage in the storage means when received, including means for cancelling the last received valid signal information.

3. A computer for dscrimination between pulses separated in time in which the space therebetween represents information to be analyzed for a recording means, comprising means to develop a control signal from a pair of spaced pulses when said pair are received within a predetermined time range, function generator means to develop a monotonically varying function responsive to the information represented between the spaced pulses, and measuring means connected to the function generator means for storing in the measuring means the peak value of the monotonically varying function when there is produced a control signal by the control signal means, said measuring means including means for cancellation of the previously stored information in the measuring means responsive to the control signal of the control signal means.

4. The computer of claim 3, further characterized by having means to insure that the control signal means provides a control signal when a pair of spaced pulses within the predetermined set of values is received after a pair of spaced pulses not within the said range of values has been rejected.

5. A computer for determining the acceptability of a pair of spaced pulses with respect to an initial pulse, comprising means to develop a control signal when there is received a pair of pulses within a predetermined time range with respect to an initial pulse having information represented by the spaced relation of the two pulses, a function generator means to develop an electrical signal characterized by a peak voltage value responsive to the information represented between the two pulses, and a consecutive peak reading voltmeter means for developing a peak value voltage responsive to information from the function generator, said consecutive peak reading voltmeter including means for storing said peak value voltage and means to cancel information previously stored in the voltmeter representing information.

6. A computer for determining the information provided by the interval between two electrical pulses comprising means to provide a control signal when the information contained in the interval bounded by the two electrical pulses represents information which is within a predetermined range of values, a function generator means to provide a signal responsive to the information characterized by the interval between the two pulses, a signal storage means to store the signal from the function generator means, means to cancel all signals having been previously stored in the storage means, and a utilization means for using the information stored by the storage means, said control signal means adapted for determining that succeeding information received thereby is not within the predetermined range, so that the information which has been developed into a function signal by the function generator means is not accepted information for storage by the storage means and the previous stored information representing information within the predetermined range of values is presented in lieu of the non-accepted information to the utilization means.

7. An electronic computer for acoustic well logging tools to analyze information represented by a time interval contained between two electrical pulses comprising means to determine whether the information represented by the two pulses is within certain predetermined values, a control means responsive to an affirmative condition of when the information is within the allowable conditions, a function generator means to generate a monotonically varying function whereby the function is proportional to the interval representing the information contained between the two electrical pulses, means for storing the peak value of the function generated by the function generator means and responsive to the control means, and a cancellation means for voiding the signal in the storage means when the next succeeding pair of two electrical pulses representing information contained between two pulses is accepted by said control means.

8. An electronic computer for acoustic well logging tools to analyze information represented by the time interval between two electrical pulses comprising means to determine whether the information represented by the two pulses is within certain limits, control means responsive to an affirmative condition of when the information is within the allowable limits, a function generator means to generate a function varying monotonically with the interval between the two electrical pulses representing the information, means responsive to said control means for storing the peak value of the function generated by said function generator means, and means for measuring the stored values as indicative of valid signal information.

9. An electronic computer in an acoustic well logging system for receiving a pair of electrical pulses spaced apart by a predetermined interval of time, each of which is responsive to an initiating pulse having been passed through an information medium, the computer for determining the interval between the pair of pulses when the interval is larger than a predetermined minimum and the pair of pulses is within a predetermined interval of time after the initiating pulse, said computer comprising a main enabling gate generator responsive to said initiating pulse, a pulse shaper for receiving a pair of electrical pulses, a start-stop switch responsive to the output of the pulse shaper and being opened by the first of the pair of electrical pulses and being closed by the second of the pair of electrical pulses, a function generator for developing a monotonically varying function in response to the "on" condition of the start-stop switch, a peak selection switch for storing the maximum output of the monotonic function developed by the function generator, a delayed discriminating gate responsive to the "on" condition of the start-stop switch for passing the output of the pulse shaper when the output of the pulse shaper follows by a determined time interval the "on" condition of the start-stop switch, a control means responsive to the output pulse passed by a delayed discriminating gate for enabling the output from the function generator to be stored in said peak selection switch, and means for recording the stored values of the peak selection switch.

10. The computer of claim 9, further characterized by a connection between the main enabling gate to the start-stop switch for coupling a pulse to insure that the start-stop switch is ready for the commencement of the next cycle of receiving a pair of electrical pulses.

11. The computer of claim 9 further characterized by having a connection between the main enabling gate and the peak selection switch, said connection including a cancellation switch for cancelling the previously stored pulses from the function generator when the last received peak pulse of the function generator is stored in the peak selection switch.

12. A computer in a cyclic acoustic well logging system for measuring the time interval between the arrival of acoustic energy at a pair of spaced receivers following transmission of acoustic energy from an acoustic transmitter wherein each of said receivers produces a characteristic electrical pulse no more than once each cycle after transmission of acoustic energy, said computer comprising means for accepting the first said electrical pulse in a cycle only when it follows said transmission after a predetermined time interval no greater than the time required for acoustic energy to pass from said transmitter to the nearest of said receivers at the greatest acoustic velocity normally encountered in the earth formations being measured but before a predetermined time after said transmission which is no less than the time required for acoustic energy to pass from said transmitter to the nearest of said receivers at the lowest acoustic velocity normally encountered in the earth formations being measured, means for accepting the next said electrical pulse in said cycle only when it follows said first pulse after a predetermined time interval no greater than the time required for acoustic energy to pass through earth formations between points opposite each of said receivers at the greatest acoustic velocity normally encountered in the earth formations being measured but before a predetermined time after said transmission which is no less than the time required for acoustic energy to pass from said transmitter to the farthest of said receivers at the lowest acoustic velocity normally encountered in the earth formations being measured, means for deriving an electrical signal which varies monotonically with the time interval between said first and next accepted pulses, means for storing the derived signal after each cycle in which two pulses are accepted until the next derived electrical signal derived from a succeeding pair of accepted pulses is produced for storage, and means for recording the stored signal.

13. A computer in a cyclic acoustic well logging system for measuring the time interval between the arrival of acoustic energy at a pair of spaced receivers following transmission of acoustic energy from an acoustic transmitter wherein each of said receivers produces a characteristic electrical pulse no more than once each cycle after each transmission of acoustic energy and wherein the pulses produced by both of said receivers are applied to the same input terminals of the computer, said computer comprising means for accepting the first said electrical pulse in a cycle only when it follows said transmission after a determined time interval related to the time required for acoustic energy to pass from said transmitter to the nearest of said receivers, and selective means for deriving and measuring an electrical signal which varies monotonically with the time interval between said first accepted pulse and the next said electrical pulse in said cycle only when said signal is representative of a time interval falling within a determined range.

14. A computer in a cyclic acoustic well logging system for measuring the time interval between the arrival of acoustic energy at a pair of spaced receivers following transmission of acoustic energy from an acoustic transmitter wherein each of said receivers produces a characteristic electrical pulse no more than once each cycle after each transmission of acoustic energy, said computer comprising means for accepting the first said electrical pulse in a cycle only when it follows said transmission after a determined time interval related to the time required for acoustic energy to pass from said transmitter to the nearest of said receivers, means for deriving an electrical signal which varies monotonically with the time interval between said first accepted pulse and the next said electrical pulse in said cycle, and means for measuring the derived signal only when it is representative of a time interval falling within a determined range.

15. A computer in a cyclic acoustic well logging system for measuring the time interval between the arrival of acoustic energy at a pair of spaced receivers following transmission of acoustic energy from an acoustic transmitter wherein each of said receivers produces a characteristic electrical pulse no more than once each cycle after transmission of acoustic energy, said computer comprising means for accepting the first said electrical pulse in a cycle only when it follows said transmission after a predetermined time interval no greater than the time required for acoustic energy to pass from said transmitter to the nearest of said receivers at the greatest acoustic velocity normally encountered in the earth formations being measured, means for accepting the next said electrical pulse in said cycle only when it follows said first pulse after a predetermined time interval no greater than the time required for acoustic energy to pass through earth formations between points opposite each of said receivers at the greatest acoustic velocity normally encountered in the earth formation being measured, means for deriving an electrical signal which varies monotonically with the time interval between said first and next accepted pulses, means for storing the derived signal after each cycle in which two pulses are accepted until the next derived electrical signal derived from a succeeding pair of accepted pulses is produced for storage, and means for recording the stored signal.

References Cited in the file of this patent
UNITED STATES PATENTS

| | | |
|---|---|---|
| 2,704,364 | Summers | Mar. 15, 1955 |
| 2,731,626 | Carolus | Jan. 17, 1956 |
| 2,857,011 | Summers | Oct. 21, 1958 |